United States Patent [19]

Latos

[11] Patent Number: 4,992,721
[45] Date of Patent: Feb. 12, 1991

[54] INVERTER FOR STARTING/GENERATING SYSTEM

[75] Inventor: Thomas S. Latos, Huntley, Ill.

[73] Assignee: Sundstrand Corporation, Rockford, Ill.

[21] Appl. No.: 470,804

[22] Filed: Jan. 26, 1990

[51] Int. Cl.$^5$ .......................... H02M 5/45; H02P 9/06
[52] U.S. Cl. ......................................... 322/10; 363/37; 363/49; 290/38 R
[58] Field of Search ............................. 363/37, 49, 64; 290/38 R, 46; 322/10, 29

[56] References Cited

U.S. PATENT DOCUMENTS

| | | |
|---|---|---|
| 3,908,161 | 9/1975 | Messenger . |
| 3,943,429 | 3/1976 | Heintze . |
| 4,119,861 | 10/1978 | Gocho .................................. 290/35 |
| 4,488,211 | 12/1984 | Miyairi . |
| 4,549,258 | 10/1985 | Honbu et al. . |
| 4,743,777 | 5/1988 | Shilling et al. . |
| 4,802,079 | 1/1989 | Mizoguchi . |
| 4,841,216 | 6/1989 | Okada et al. .................... 290/38 R |
| 4,862,341 | 8/1989 | Cook .................................. 290/38 R |
| 4,905,134 | 2/1990 | Recker et al. ....................... 363/37 |

Primary Examiner—Steven L. Stephan
Assistant Examiner—Nilay H. Vyas
Attorney, Agent, or Firm—Marshall, O'Toole, Gerstein, Murray & Bicknell

[57] ABSTRACT

An inverter for use with a brushless generator for operating the generator in generating and starting modes includes an interphase transformer (IPT) having first and second end terminals and a mid-tap, a first subinverter coupled between a rectifier and the first end terminal of the IPT and a second subinverter. Contactors are operable in the generating mode for coupling a main generator portion armature winding to the rectifier and the second subinverter between the rectifier and the second end terminal of the IPT. The contactors are operable in the starting mode for coupling a source of power to the rectifier, the IPT mid-tap to the main generator portion armature winding and the second subinverter between the rectifier and an exciter field winding of the geneator. A control unit is operable in the generating mode for operating the subinverters such that substantially constant-frequency AC power is produced at the mid-tap at the IPT and is further operable in the starting mode such that AC waveforms are delivered to the exciter field winding and the main generator portion armature windings so that the generator is operated as a motor.

5 Claims, 4 Drawing Sheets

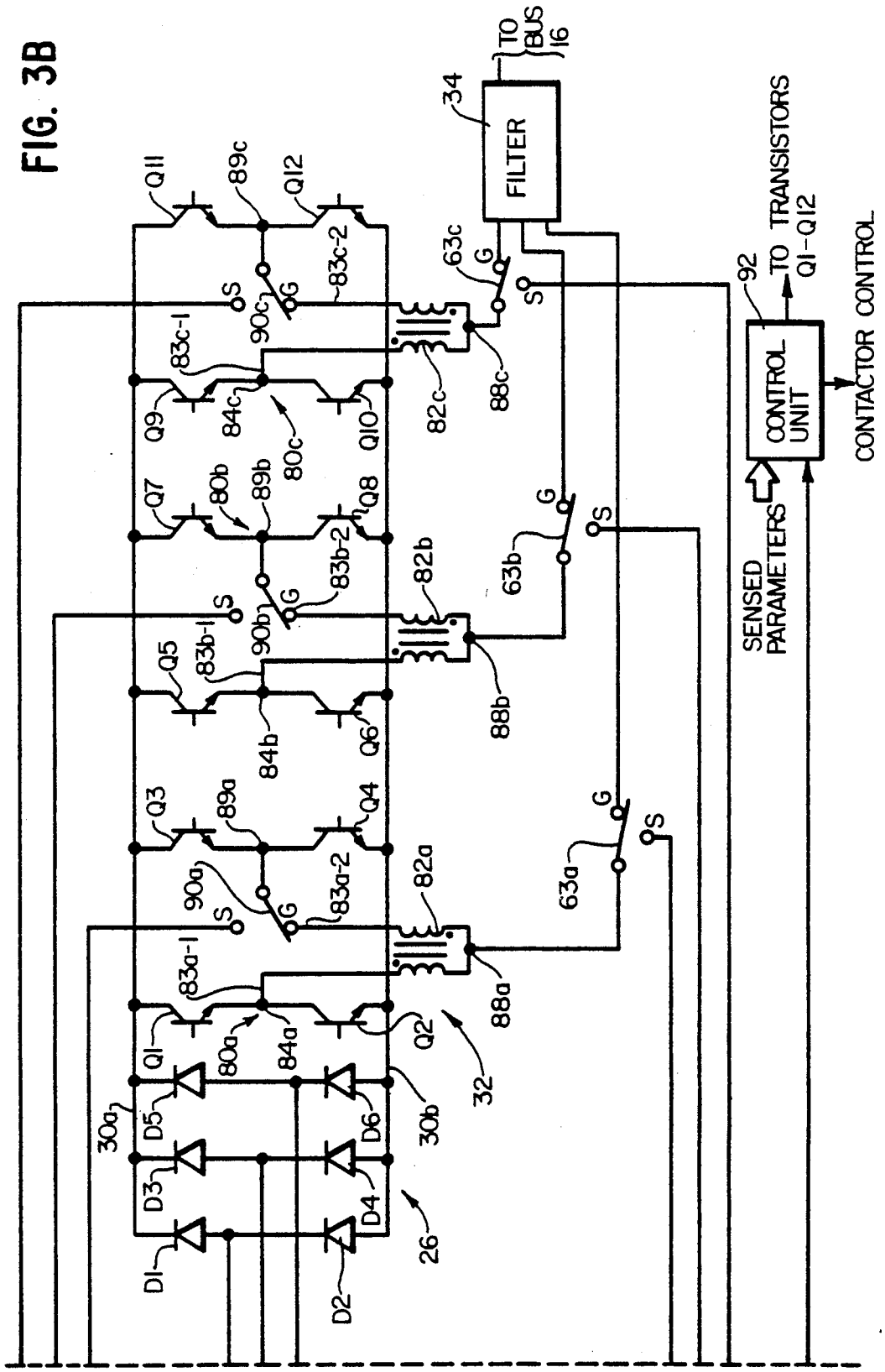

INVERTER FOR STARTING/GENERATING SYSTEM

TECHNICAL FIELD

The present invention relates generally to power converters, and more particularly to an inverter for a power generating system which is operable in starting and generating modes.

BACKGROUND ART

In a variable-speed, constant-frequency (VSCF) power conversion system, a brushless, synchronous generator is supplied variable-speed motive power produced by a prime mover and develops variable-frequency AC power at an output thereof. The variable-frequency power is rectified and provided over a DC link to a controllable static inverter. The inverter is operated to produce constant-frequency AC power, which is then supplied over a load bus to one or more loads.

Usually, such VSCF systems must provide a high level of load current, and hence switches used in the inverter must be high power devices and/or be connected in parallel. High power switching devices are expensive and somewhat difficult to control. Parallel-connected power switches encounter problems due to current sharing, and hence this approach is not entirely satisfactory as an alternative.

Heintze, U.S. Pat. No. 3,943,429, Honbu et al., U.S. Pat. No. 4,549,258 and Mizoguchi, U.S. Pat. No. 4,802,079 disclose polyphase inverters wherein each phase comprises first and second subinverters having outputs interconnected by a reactor such as an interphase transformer or a choke. A mid-tap of the reactor is coupled to a load. The switches of such inverters are subjected to only a fraction of the load current, and hence devices of smaller current rating can be used. Also, the reactor eliminates problems arising from current sharing.

As is known, a generator can be operated as a motor in a starting mode to convert electrical power supplied by an external AC power source into motive power which may in turn be provided to the prime mover to bring it up to self-sustaining speed. In the case of a brushless, synchronous generator having a permanent magnet generator (PMG), an exciter portion and a main generator portion mounted on a common shaft, it is necessary to provide power developed by an external power source at a controlled voltage and frequency to armature windings of the main generator portion and to provide field current to the main generator portion via the exciter portion so that the motive power may be developed.

Dhyanchand, co-pending application Ser. No. 07/408,928, filed Sept. 18, 1989 and assigned to the assignee of the instant application (Sundstrand Docket No. B03265-AT1-USA) discloses a VSCF system of the above-described type having a set of three exciter field windings which are connected in a wye configuration in a starting mode of operation. During operation in a generating mode of operation, two of the exciter field windings are connected in parallel and the remaining winding is connected in series with the parallel combination. The same windings may therefore be used in the starting and generating modes. AC power for the exciter field windings during operation in the starting mode is obtained from an external AC power source, a rectifier coupled to the external AC power source and an exciter power converter coupled to the rectifier. During operation in the generating mode, DC exciter power is obtained from the PMG, an autotransformer which steps down the PMG armature voltage level, a rectifier and a power converter which may form a part of the exciter power converter.

Shilling, et al., U.S. Pat. No. 4,743,777 discloses a starter generator system using a brushless, synchronous generator. The system is operable in a starting mode to produce motive power from electrical power provided by an external AC power source. An exciter of the generator includes separate DC and three-phase AC field windings disposed in a stator. When operating in a starting mode at the beginning of a starting sequence, the AC power developed by the external AC power source is directly applied to the three-phase AC exciter field windings. The AC power developed by the external AC source is further provided to a variable-voltage, variable-frequency power converter which in turn provides a controlled voltage and frequency to armature windings of a main generator. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power.

When the generator is operated in a generating mode, switches are operated to disconnect the AC exciter field windings from the external AC source and to provide DC power to the DC exciter field winding.

Messenger, U.S. Pat. No. 3,908,161 discloses a brushless generator including three exciter field windings which are connected in a wye configuration and provided three-phase AC power during operation in a starting mode. The three-phase AC power induces AC power in an exciter armature winding which is rectified and applied to a main generator field winding. Main armature windings receive controlled AC power to in turn cause rotation of the generator rotor. Thereafter, the three exciter field windings are connected in series and provided DC excitation when operating in a generating mode.

SUMMARY OF THE INVENTION

In accordance with the present invention, an inverter includes first and second subinverters coupled together by an interphase transformer and operates in a generating mode to produce constant-frequency AC power and operates in a starting mode to separately supply exciter field current and main armature current to a brushless generator operating as a motor.

More particularly, an inverter for use with a brushless generator having exciter and main generator portions wherein the inverter is operable in a generating mode and a starting mode includes an interphase transformer (IPT) having first and second end terminals and a mid-tap, a first subinverter coupled between the rectifier and the first end terminal of the IPT and a second subinverter coupled to the rectifier. Means are operable in the generating mode for coupling an armature winding of the main generator portion to the rectifier and the second subinverter between the rectifier and the second end terminal of the IPT. During operation in the generating mode each subinverter handles only a portion of the total AC power delivered to a load. During operation in the starting mode, a source of power is coupled to the rectifier, the IPT mid-tap is coupled to the main generator portion armature winding and the second subinverter is coupled to a field winding of the exciter portion. The subinverters are operated in the starting mode such that AC waveforms are delivered to the exciter portion field winding and to the main generator portion armature winding so that the generator is operated as a motor.

Since the IPT ensures that each of the power switches handles only a portion of the load current during operation in the generating mode, the power switches may have a relatively low current handling capability as compared to an inverter wherein each switch handles all of the load current. Further, the first and second subinverters separately supply the exciter portion field current and the main generator portion armature current during operation in the starting mode. Significantly, the magnitudes of these currents can be independently controlled, thereby permitting the design of the exciter power converter to be simplified.

BRIEF DESCRIPTION OF THE DRAWINGS

FIGS. 3A and 3B, when joined along the dashed lines, together comprise a simplified schematic diagram of the inverter of FIG. 2 according to the present invention in conjunction with the brushless generator, rectifier and components associated therewith.

DESCRIPTION OF THE PREFERRED EMBODIMENT

Figure 1:
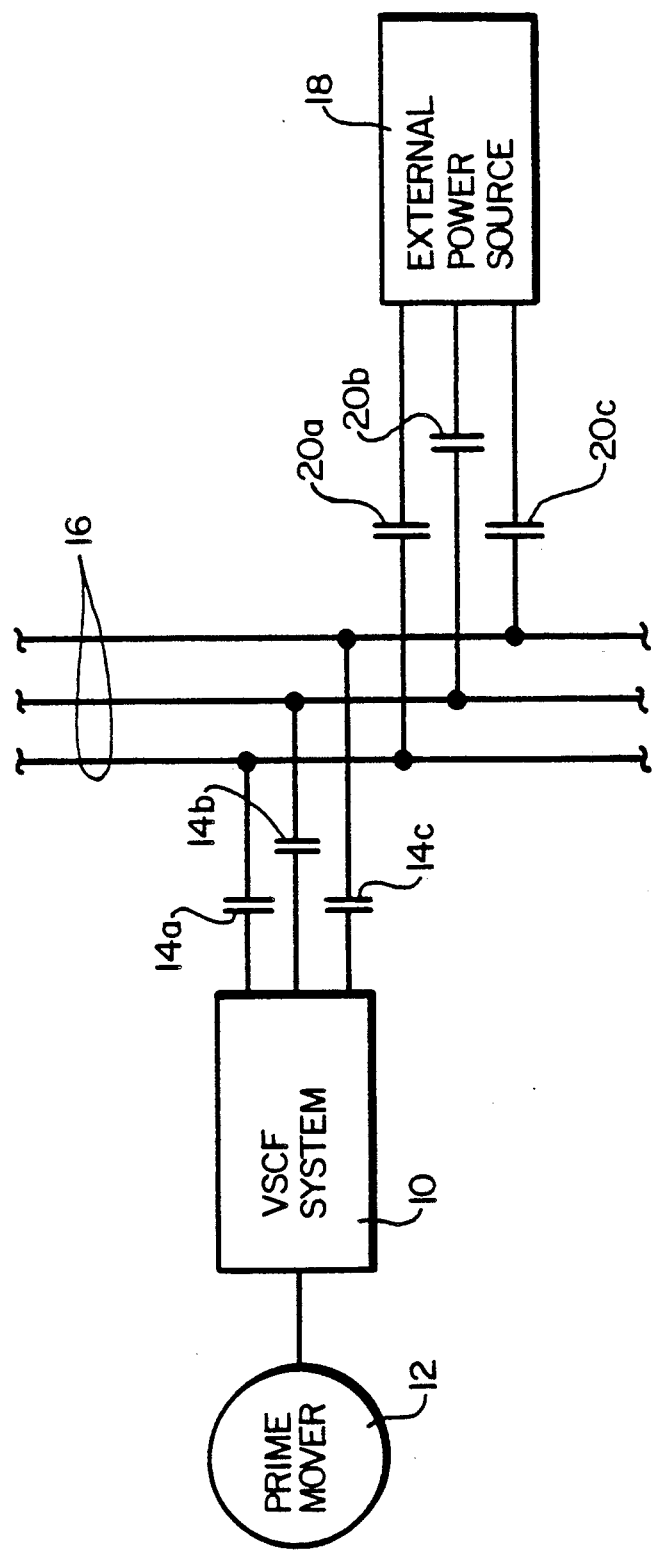
FIG. 1 is a block diagram of a VSCF power conversion system.

Referring now to FIG. 1, a variable-speed, constant-frequency (VSCF) power conversion system 10 operates in a generating mode to convert variable-speed motive power produced by a prime mover 12, such as an aircraft jet engine, into constant-frequency AC electrical power which is delivered through controllable contactors 14a–14b, 14c to a load bus 16. The VSCF system 10 is also operable in a starting mode using electrical power provided by an external power source 18, such as a ground power cart, which is in turn coupled to the load bus 16 through controllable contactors 20a–20c. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Figure 2:
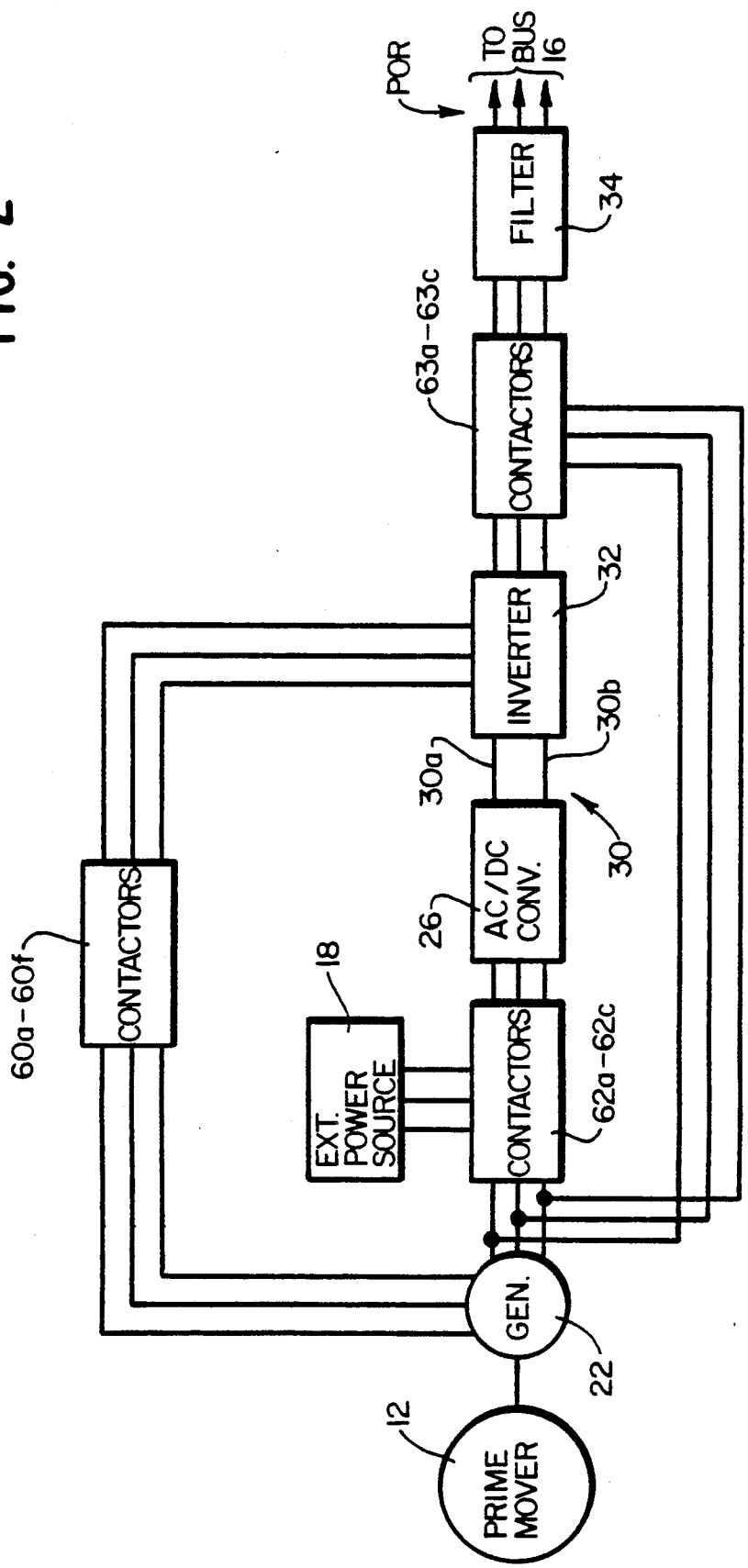
FIG. 2 comprises a combined mechanical and electrical block diagram of the VSCF power conversion system of FIG. 1.

Referring now to FIG. 2, the VSCF system 10 includes a brushless, synchronous generator 22 driven by the prime mover 12. During operation in the generating mode, the generator 22 develops polyphase, variable-frequency AC power which is converted into DC power by a rectifier/filter 26. The resulting DC power is provided over conductors 30a, 30b of a DC link 30 to a polyphase inverter 32 according to the present invention which converts the DC power into three-phase, constant-frequency AC power. This AC power may be filtered by an optional filter 34 and is provided via the set of controllable contactors 14a–14c to the load bus 16.

Figure 3A:
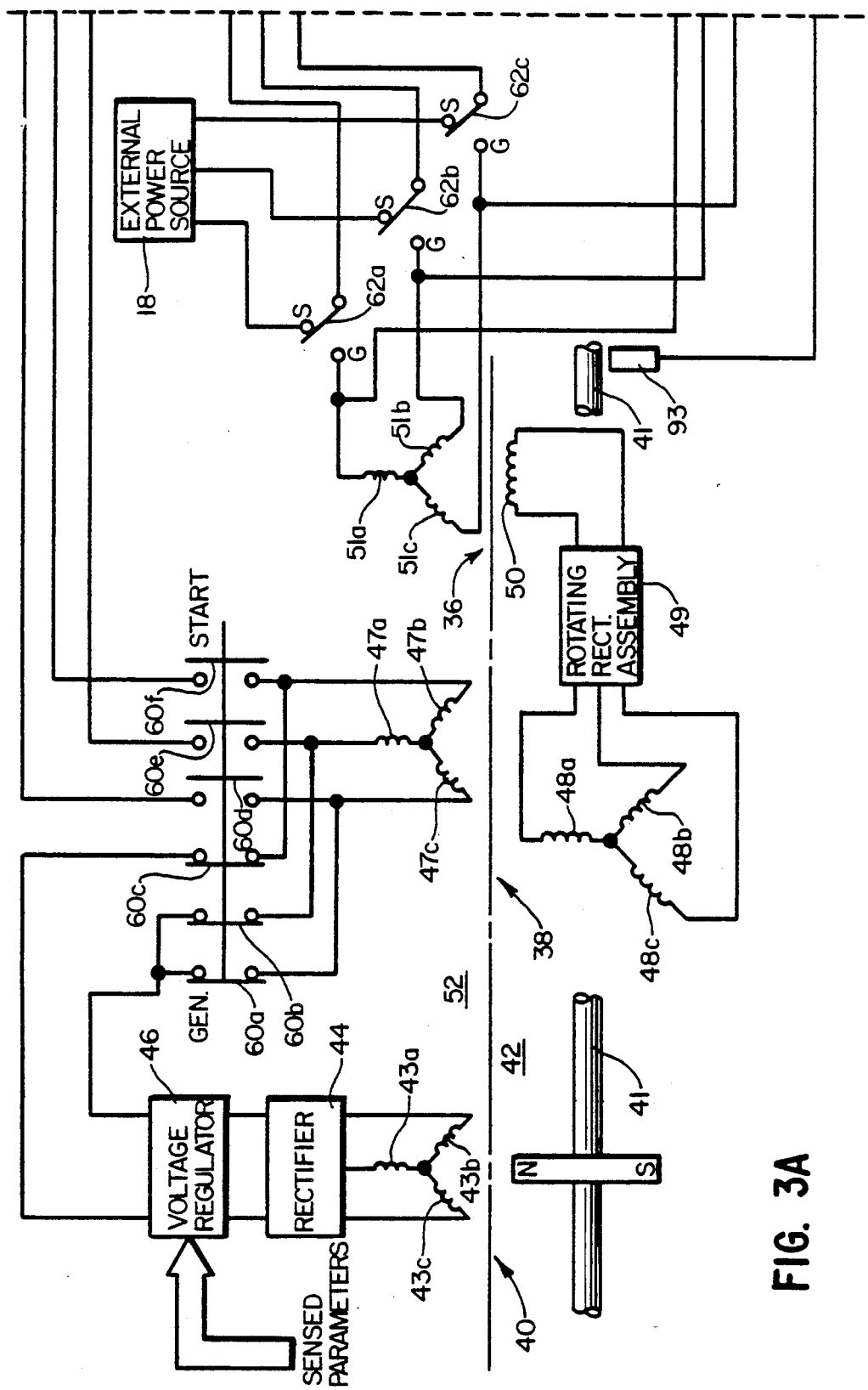

Referring also to FIGS. 3A and 3B, the generator 22 includes a main generator portion 36, an exciter portion 38 and a permanent magnet generator (PMG) 40, all of which include rotor structures mounted on a common shaft 41 of a rotor 42. The generator further includes a set of PMG armature windings 43a–43c, a rectifier 44, an exciter power converter in the form of a controllable voltage regulator 46, a set of exciter portion field windings 47a–47c, a set of exciter portion armature windings 48a–48c, a rotating rectifier assembly 49, a main generator portion field winding 50 and a set of main generator armature windings 51a–51c. The PMG armature windings 43a–43c, the exciter field windings 47a–47c and the main generator portion armature windings 51a–51c are disposed in a stator 52 of the generator 22.

In the generating mode of operation, rotation of the common shaft 41 in turn causes polyphase control power to be developed in the PMG armature windings 43a–43c which is in turn delivered to the rectifier 44 and the voltage regulator 46. The voltage regulator 46 is responsive to one or more sensed parameters, for example the voltage at a point of regulation POR, FIG. 2, at or near the AC load bus 16. The rectifier 44 and the voltage regulator 46 deliver a controlled magnitude of DC current through closed contactors 60a–60c of a set of contactors 60 to the exciter field windings 47a–47c. The contactors 60a–60c connect the windings 47a–47c in a DC configuration wherein the windings 47a and 47c are connected in parallel and the winding 47b is connected in series with the parallel-connected windings 47a and 47c. The field current induces AC voltages in the armature windings 48a–48c which are rectified by the rotating rectifier assembly 49. The resulting DC power is supplied to the field winding 50 of the main generator portion 36. Rotation of the shaft 41 while the field current is flowing in the field winding 50 in turn causes polyphase voltages to be developed in the main generator portion armature windings 51a–51c. As seen specifically in FIG. 3A, these voltages are supplied through contactor sets represented by single-pole, double-throw switches 62a–62c to the rectifier 26, FIG. 3B.

As seen in FIG. 3B, the inverter includes three legs 80a, 80b and 80c. Each leg 80a–80c includes two subinverters formed by two pairs of power switches in the form of transistors Q1–Q4, Q5–Q8 and Q9–Q12, respectively. The switches of each leg, for example the switches Q1–Q4 of the leg 80a, are connected in a bridge configuration wherein a first pair of series-connected power switches Q1 and Q2 is connected across the DC link conductors 30a and 30b, as is a second pair of series-connected power switches Q3 and Q4. An interphase transformer (IPT) 82a includes first and second end terminals 83a-1, 83a-2 wherein the first end 83a-1 is coupled directly to a junction 84a between the power switches Q1, Q2. A mid-tap 88 of the IPT comprises a phase output of the inverter during operation in the generating mode and is coupled to contactors represented by a switch 63a. Also during operation in this mode, a junction 89a between the power switches Q3, Q4 is coupled by contactors represented by a single-pole, double-throw switch 90a to the second end terminal 83a-2.

In like fashion, an IPT 82b includes first and second end terminals 83b-1 and 83b-2 coupled directly to a junction 84b and to a junction 89b through contactors represented by a single-pole, double-throw switch 90b. A mid-tap 88b of the IPT 82b is coupled to contactors represented by a switch 63b.

Still further, an IPT 82c includes a first end terminal 83c-1 coupled directly to a junction 84c between the series-connected pair of power switches Q9, and Q10. A second end terminal 83c-2 is coupled by contactors represented by a single-pole, double-throw switch 90c to a junction 89c between the series-connected power switches Q11, Q12. A mid-tap 88c comprises a phase output during operation in the generating mode and is coupled to contactors represented by a switch 63c.

Also, during operation in the generating mode, the sets of contactors represented by the switches 63a-63c connect the output of the inverter 32 to the filter 34 so that the AC power is provided to the load bus 16. It should be noted that the contactors 14a-14c and 20a-20c are not shown in FIGS. 2 and 3 for clarity.

During operation in the starting mode, the contactor sets represented by the switches 62a-62c and 63a-63c are moved to the positions opposite those shown in FIGS. 3A and 3B so that the external power source 18 is coupled to the input of the rectifier 26 and a first output of the inverter 32 is coupled to the armature windings 51a-51c of the main generator 36. In addition, the sets of contactors 60a-60f, 62a-62c, 63a-63c and 90a-90c are moved to positions opposite those shown in FIGS. 3A and 3B so that a second polyphase output of the inverter 32 is provided to the field windings 47a-47c of the exciter 38. Such application of power in turn causes the rotor structures, and hence the common shaft 41, to accelerate, in turn accelerating the prime mover 12. Once a particular speed of the shaft 41 is reached, the contactors 60a-60f are moved to the positions shown in FIG. 3A so that the contactors 60a-60c connect the exciter field windings 47a-47c in the DC configuration. The DC current of controlled magnitude is then provided by the rectifier 44 and the voltage regulator 46 to the exciter field windings 47a-47c. The generating system 10 may thereafter be operated in the generating mode once the prime mover 12 reaches operating speed.

More specifically, at the beginning of operation in the starting mode, the contactors 60a-60c are opened while the contactors 60d-60f are closed. The contactors 90a-90c are moved to the positions opposite those shown in FIG. 3B so that the junctions 89a-89c are coupled by the contactors 90a-90c and 60d-60f to the exciter field windings 47a-47c. Further, the contactors 63a-63c are moved to the positions opposite those shown in FIG. 3B so that the mid-taps 88a-88c of the IPT's 82a-82c are coupled to the armature windings 51a-51c of the main generator portion 36. The external power source 18 is coupled by the contactors 62a-62c to the rectifier 26 comprising diodes D1-D6. A control unit 92 is responsive to the output of a rotor position sensor in the form of a resolver 93, FIG. 3A, and is further responsive to one or more sensed parameters of the power delivered to the windings 51a-51c. The control unit 92 operates the switches Q3, Q4, Q7, Q8 and Q11 and Q12 to provide power to the windings 47a-47c during operation in the starting mode at voltages and frequencies which result in a proper level of field current in the main generator portion field winding 50. In addition, the control unit 92 operates the switches Q1, Q2, Q5, Q6, Q9 and Q10 to provide power at a constant voltage-to-frequency ratio to the main generator portion armature windings 51a-51c so that the shaft 41 is accelerated in a controlled fashion. During the starting mode, the generator 22 operates in a similar fashion to a slip ring induction motor to provide motive power to the prime mover 12.

Once the speed of the shaft 41 reaches a certain speed, as detected by sensing the output of the resolver 93, the contactors 60a-60c are closed and the contactors 60d-60f are opened. The windings 47a and 47c are thus connected in the DC configuration. The DC current developed by the rectifier 44 and the voltage regulator 46 is thereafter provided to the windings 47a-47c.

Thereafter, further acceleration of the shaft 41 may be accomplished by operating the switches Q1, Q2, Q5, Q6, Q9 and Q10 to suitably energize the windings 51a-51c and operation in the generating mode may be commenced by moving the contactors 62a-62c, 63a-63c and 90a-90c to the positions shown in FIG. 3B. The control unit 92 operates corresponding switches of each inverter leg in parallel, e.g. the switches Q1 and Q3 are operated together, as are the switches Q2 and Q4. The IPT's 82a-82c cause each power switch Q1-Q12 to handle only one-half the total load current so that lower current-handling capability devices may be used.

Control of the contactors 52a-52c, 53a-53c and 60a-60f may also be effected by the control unit 92. The design of the control unit 92 is straightforward and may be implemented in whole or in part by software or hardware.

It should be noted that the excitation system illustrated in FIG. 3A may be replaced by a different excitation system, if desired. For example, separate AC and DC exciter field windings may be provided in the stator 54 and are electromagnetically linked to the armature windings 48a-48c. During operation in the starting mode, AC power is provided to the AC windings by the switches Q3, Q4, Q7, Q8, Q11 and Q12. Once the certain shaft speed is reached, the AC power is removed from the AC windings and DC power is provided to the DC winding by the rectifier 44 and the voltage regulator 46.

The inverter 32 of the present invention controls not only the power provided to the main generator portion armature windings 51a-51c, but also the power delivered to the exciter field windings during operation in the starting mode. Thus, the voltage regulator 46 need not assume this function and hence can be simplified.

I claim:

1. An inverter for use with a brushless generator having exciter and main generator portions, the exciter having a field winding and an armature winding coupled to a field winding of the main generator portion wherein the main generator portion includes an armature winding coupled by a rectifier to the inverter and wherein the inverter is operable in a generating mode to convert DC power produced by the generator and rectifier into AC power and is operable in a starting mode to convert power supplied by a power source into AC power which is applied to the generator to cause it to operate as a motor, comprising:

an interphase transformer (IPT) having first and second end terminals and a mid-tap;

a first subinverter coupled between the rectifier and the first end terminal of the IPT;

a second subinverter;

means operable in the generating mode for coupling the main generator portion armature winding to the rectifier and the second subinverter between the rectifier and the second end terminal of the IPT and operable in the starting mode for coupling the power source to the rectifier, the IPT mid-tap to the main generator portion armature winding and the second subinverter between the rectifier and the exciter field winding; and means operable in the generating mode for controlling the subinverters such that substantially constant-frequency AC power is produced at the mid-tap of the IPT and operable in the starting mode for controlling the subinverters such that AC waveforms are delivered to the exciter field winding and the main generator portion armature winding so that the generator is operated as a motor.

2. The inverter of claim 1, wherein the coupling means comprises a series of controllable contactors.

3. The inverter of claim 1, wherein each subinverter includes a pair of power switches connected together at a junction.

4. The inverter of claim 3, wherein the junction of the first subinverter is coupled to the first end terminal of the IPT and wherein the coupling means connects the junction of the second subinverter to the second end of the IPT during operation in the generating mode and connects the junction of the second subinverter to the exciter field winding during operation in the starting mode.

5. An inverter for use with a brushless generator having exciter and main generator portions, the exciter having a field winding and an armature winding coupled to a field winding of the main generator portion wherein the main generator portion includes an armature winding coupled by a rectifier to the inverter and wherein the inverter is operable in a generating mode to convert DC power produced by the generator and rectifier into AC power and is operable in a starting mode to convert power supplied by a power source into AC power which is applied to the generator to cause it to operate as a motor, comprising:

an interphase transformer (IPT) having first and second end terminals and a mid-tap;

first and second power switches connected together in series at a first junction therebetween to form a first series combination across first and second DC link conductors coupled to the rectifier, the first junction between the first and second power switches being converted to the first end terminal of the IPT;

third and fourth power switches connected together in series at a second junction therebetween to form a second series combination across the first and second DC link conductors;

a control unit; and contactors operable by the control unit in the generating mode for coupling the main generator portion armature winding to the rectifier, the second junction to the second end terminal of the IPT and the IPT mid-tap to a load and operable in the starting mode for coupling the power source to the rectifier, the IPT mid-tap to the main generator portion armature winding and the second junction to the exciter field winding;

wherein the control unit operates the first through fourth power switches during operation in the operating mode to produce constant-frequency AC power at the load and operates the first through fourth power switches during operation in the starting mode such that AC waveforms are delivered to the exciter field winding and the main generator portion armature winding so that the generator is operated as a motor.

* * * * *